July 26, 1938.　　　　　S. L. KERR　　　　　2,124,619
SURGE SUPPRESSOR APPARATUS AND SYSTEM
Filed Aug. 15, 1934　　　9 Sheets-Sheet 1
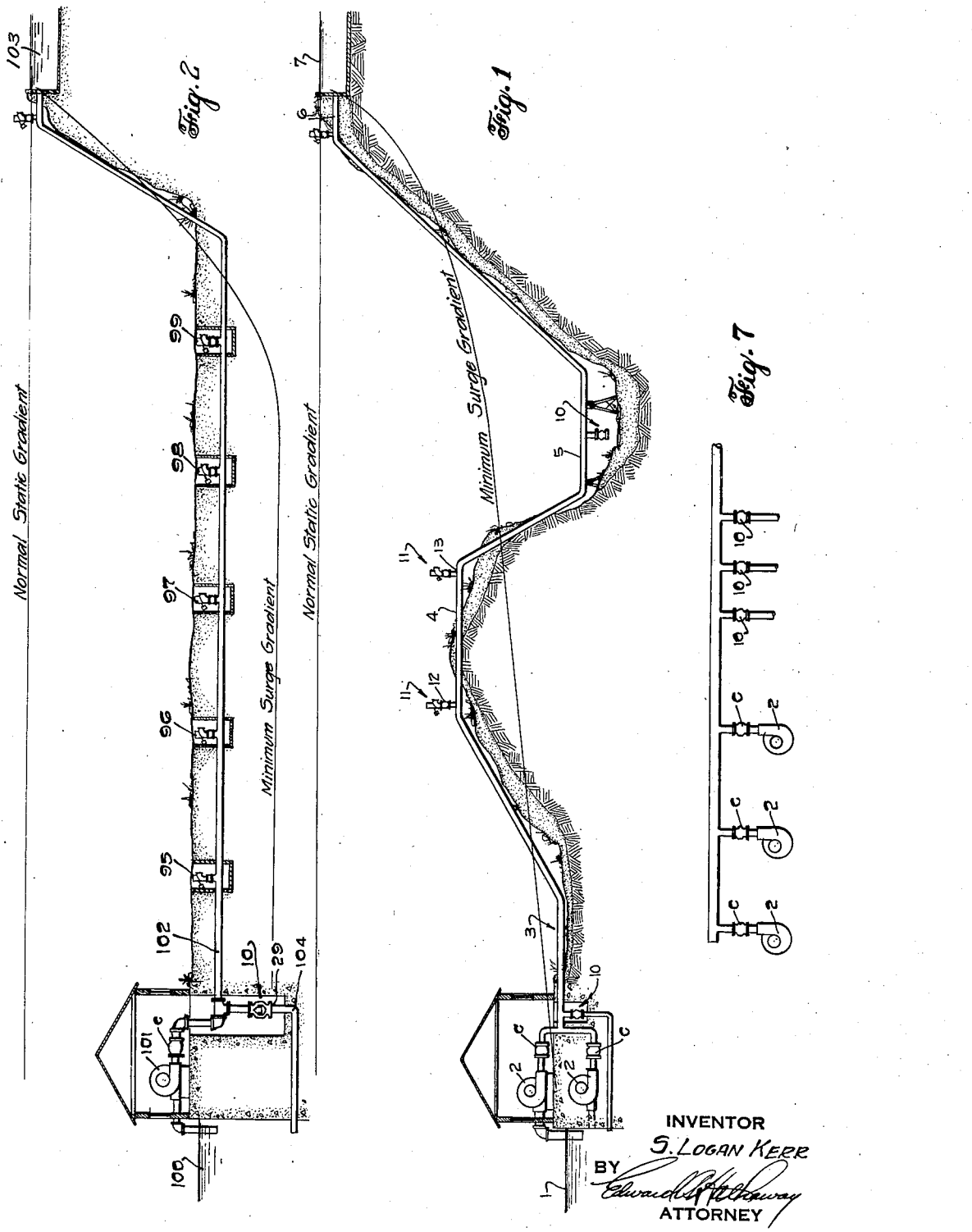
INVENTOR
S. LOGAN KERR
BY
Edward S. Hathaway
ATTORNEY

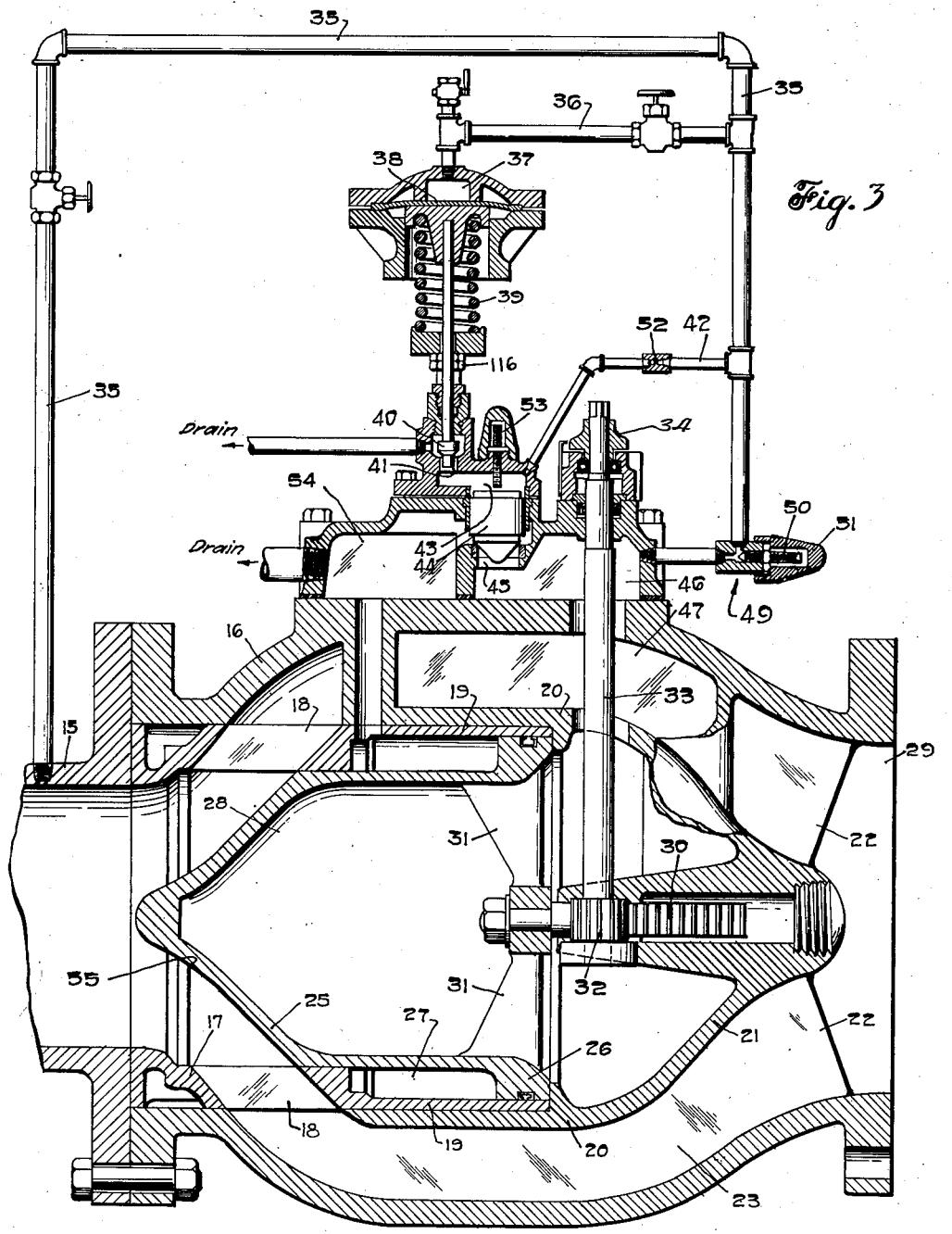

July 26, 1938.  S. L. KERR  2,124,619
SURGE SUPPRESSOR APPARATUS AND SYSTEM
Filed Aug. 15, 1934  9 Sheets-Sheet 4

INVENTOR
S. LOGAN KERR
BY
ATTORNEY

July 26, 1938.  S. L. KERR  2,124,619
SURGE SUPPRESSOR APPARATUS AND SYSTEM
Filed Aug. 15, 1934  9 Sheets-Sheet 6
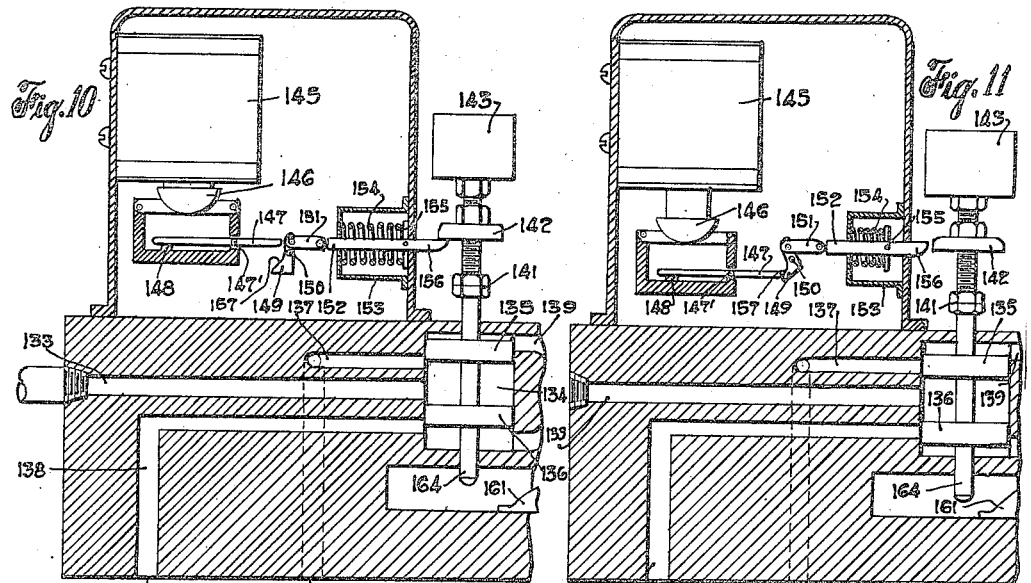
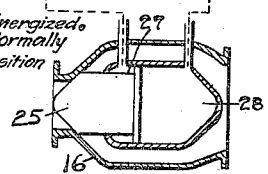
Solenoid Energized.
Valve in Normally
Closed Position
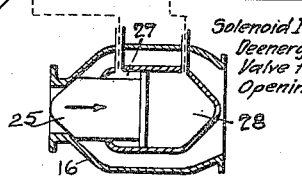
Solenoid Initially
Deenergized.
Valve to Start
Opening
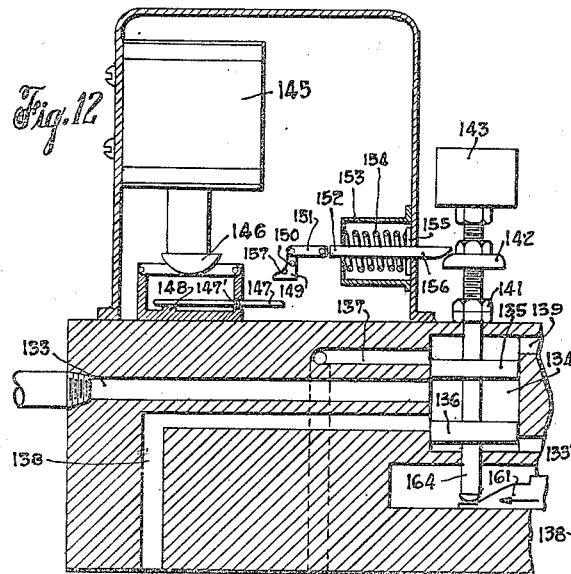
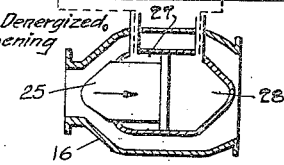
Solenoid Denergized.
Valve opening
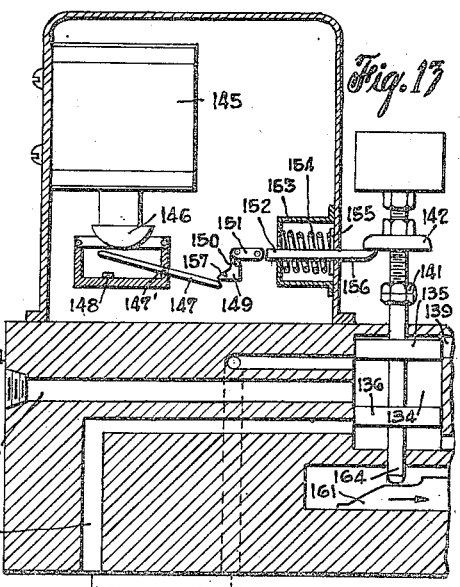
Initial Reclosing of
Valve Without Re-
energizing Solenoid.
INVENTOR
S. Logan Kerr
By
Atty.

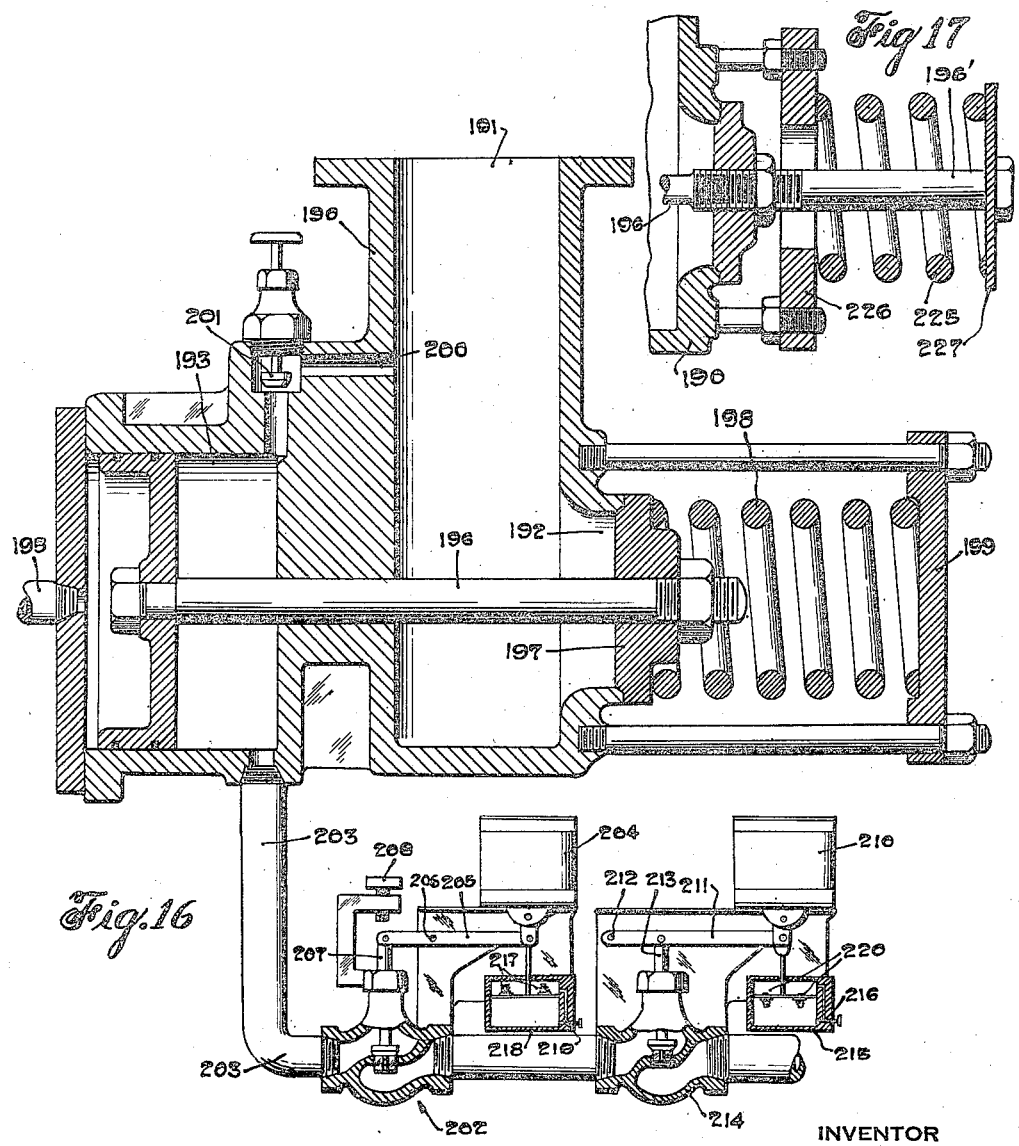

July 26, 1938.　　　　　S. L. KERR　　　　　2,124,619
SURGE SUPPRESSOR APPARATUS AND SYSTEM
Filed Aug. 15, 1934　　　9 Sheets-Sheet 9

INVENTOR
S. Logan Kerr
BY
ATTORNEY

Patented July 26, 1938

2,124,619

UNITED STATES PATENT OFFICE 2,124,619

SURGE SUPPRESSOR APPARATUS AND SYSTEM

Samuel Logan Kerr, Philadelphia, Pa., assignor to Baldwin-Southwark Corporation, a corporation of Delaware Application August 15, 1934, Serial No. 739,896
In Mexico July 14, 1934

15 Claims. (Cl. 137—78)

This invention relates generally to pumping and the control of surge conditions created thereby, the invention relating more particularly to an improved combination of a pump, a pipe line and improved valves for suppressing pressure surges in the line created by stopping of the pump.

In pumping systems, especially those having long pipe lines, when the pump stops due either to normal or emergency shutting down of the pumps and the check valve in the pipe line closes, the momentum of the water in the pipe line continues in a downstream direction thereby tending to reduce the pressure along a minimum surge pressure gradient with the lowest pressure at a point near the pumping end of the line and substantially normal pressure at the far end of the line, this pressure surge being referred to as a down surge. However, when the energy of the down surge has been expended, a return surge occurs whereupon pressure will build up along a pressure gradient with a maximum pressure above normal occurring at the pump end of the line and a minimum pressure at the other end. This initial return surge is usually followed by further alternate down and return surges of gradually decreasing proportions until finally these pressure waves die out. Depending upon the length of the pipe line, such pressure waves may last for a period of several minutes or half an hour. However, such return surges and particularly the initial return surge causes a very dangerous pressure rise above normal. In some instances, water hammer created will place undue strains upon the pipe line, thus tending to spread the pipe joints and otherwise weaken the system. Inasmuch as the pumping system herein described is more commonly found in water distribution systems of cities, towns and the like, it is of vital importance that proper control should be maintained over the surge pressure conditions in the pipe line.

Another problem has to do with systems or installations where the initial surge characteristics may vary in accordance with operating conditions. While two or more suppressor valves may be utilized to control the pressure surges in accordance with their initial variations, yet it is one object of my invention to provide improved means whereby one or more suppressor valves are adapted to fully or partially open automatically in accordance with different initial surge characteristics. A further object is to provide a suppressor valve and control means for opening the valve at a controlled rate in response to a down surge whereby the longer the initial surge thereof lasts, the greater will be the valve opening, and yet irrespective of when the return surge occurs, the valve is open to provide a free discharge in proportion to the magnitude of the return surge, after which the valve preferably is closed automatically. One example of the manner in which varied surge characteristics are caused is where two or more pumps supply a common line. If one pump is stopped or two or more are stopped simultaneously, then the surge conditions during the stopping of one pump are different from those for two or more pumps. It is a further object of my invention to control such variations by providing improved means for effecting different degrees of valve opening automatically in accordance with the number of pumps which are stopped or in accordance with different initial characteristics of the surges. It will be understood that one valve, if of sufficient size, may be used for two or more pumps, although two or more valves of smaller size may be used in case there is not room for one large valve. However, in this case the plurality of valves would simultaneously operate as though they were a single valve but when desirable the valves may open successively and at different rates.

A further object is to provide a pumping system having an improved valve adapted to function both as an air valve and a suppressor valve, this improved mode of operation being accomplished by having such valves disposed at points in the pipe line between the minimum surge pressure gradient and the normal static pressure gradient. As a result of this improved combination, if a down surge, in either a substantially horizontal pipe line or in a pipe line having an intermediate down hill portion, should create a sub-atmospheric pressure in the line, then air is admitted to the pipe line to prevent its collapse or to avoid parting of the water column. The valve has a predetermined rate of closure in coordination with the characteristics of the pipe line system so that upon the return surge the valve is in its open position to permit free discharge of liquid from the pipe line over a controlled period of time thereby adequately dissipating the energy of the return surge after which the valve is closed. While air vent valves per se are well known in the art, yet they are not arranged to function as in my improved combination wherein the valve functions not only as an air vent valve but also as an intermediate suppressor valve, that is, it is located at intermediate points in the pipe line and intermediate the minimum surge pressure gradient and the normal static pressure gradient.

A further object is to provide in combination with a pump, an improved reflux suppressor system which is particularly adapted for pipe lines extending substantially horizontal over an extended distance. In my improved reflux system, upon stopping of the pump the pipe line is maintained in open communication with the sump or other suitable source of water to be pumped, thereby allowing the down surge to draw water into the pipe line from the sump. This reflux action through the suppressor valve minimizes or eliminates the possibility of sub-atmospheric pressure being created in the pipe line. The suppressor valve is so controlled as to remain open upon occurrence of the return surge in the pipe line thereby permitting energy of the return surge to be dissipated by free discharge through the valve into the sump. Thereafter the valve is gradually reclosed.

Other objects and advantages will be more apparent to those skilled in the art from the following description of the accompanying drawings in which:

Fig. 1 is a diagrammatic elevational view of a pumping system and embodying improved features of my invention;

Fig. 2 is an elevational view of a pumping system for a substantially horizontal pipe line and embodying improved features of my invention;

Fig. 3 is a longitudinally sectional view of my improved surge suppressor valve;

Figure 8:
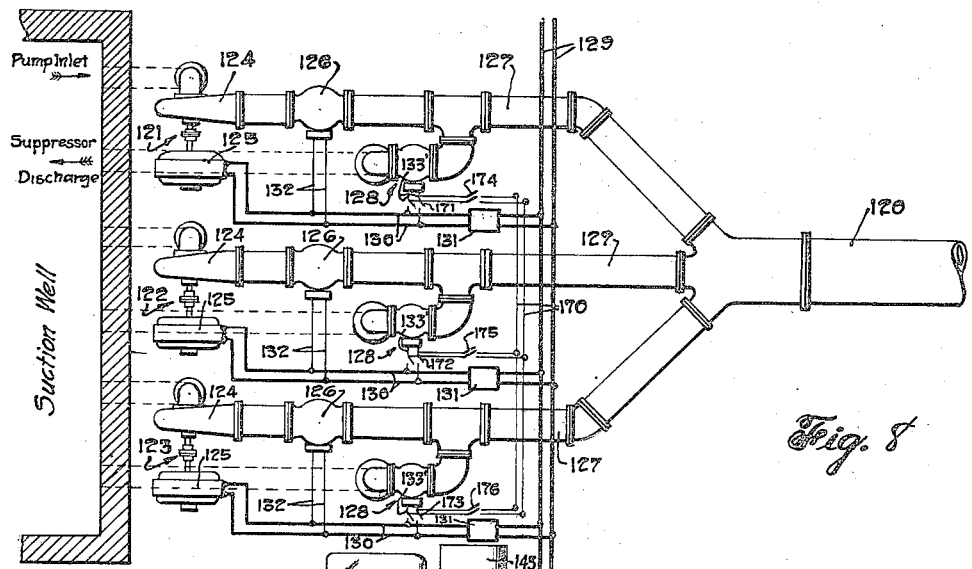
Figure 9:
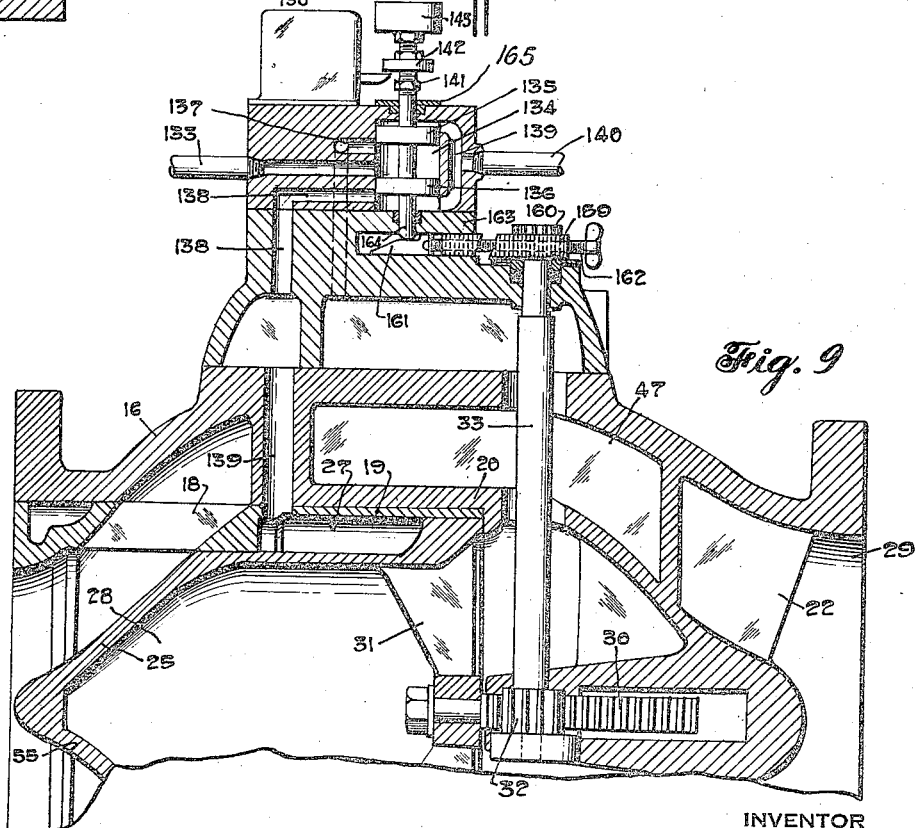
Figure 14:
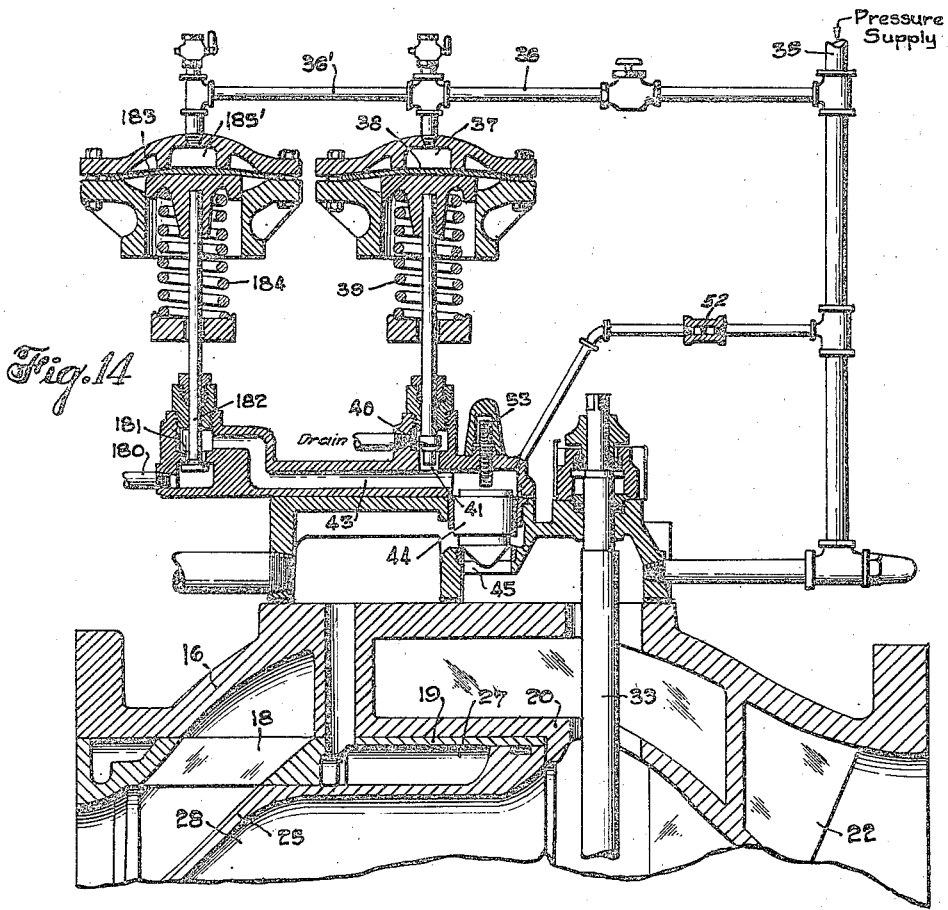
Figure 15:
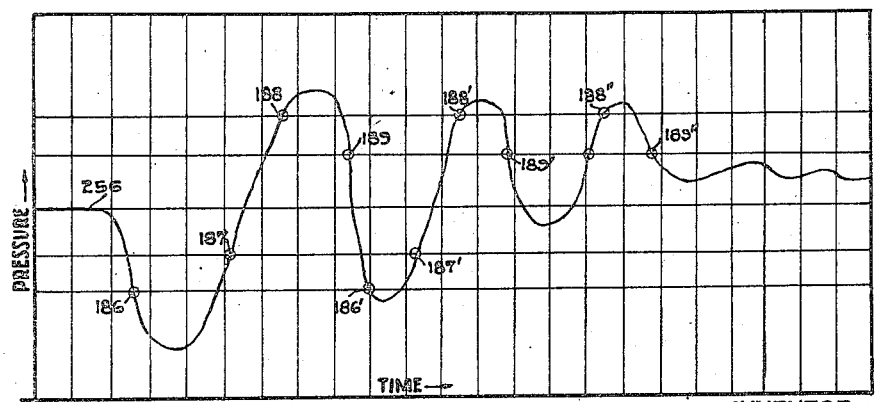
Figure 21:
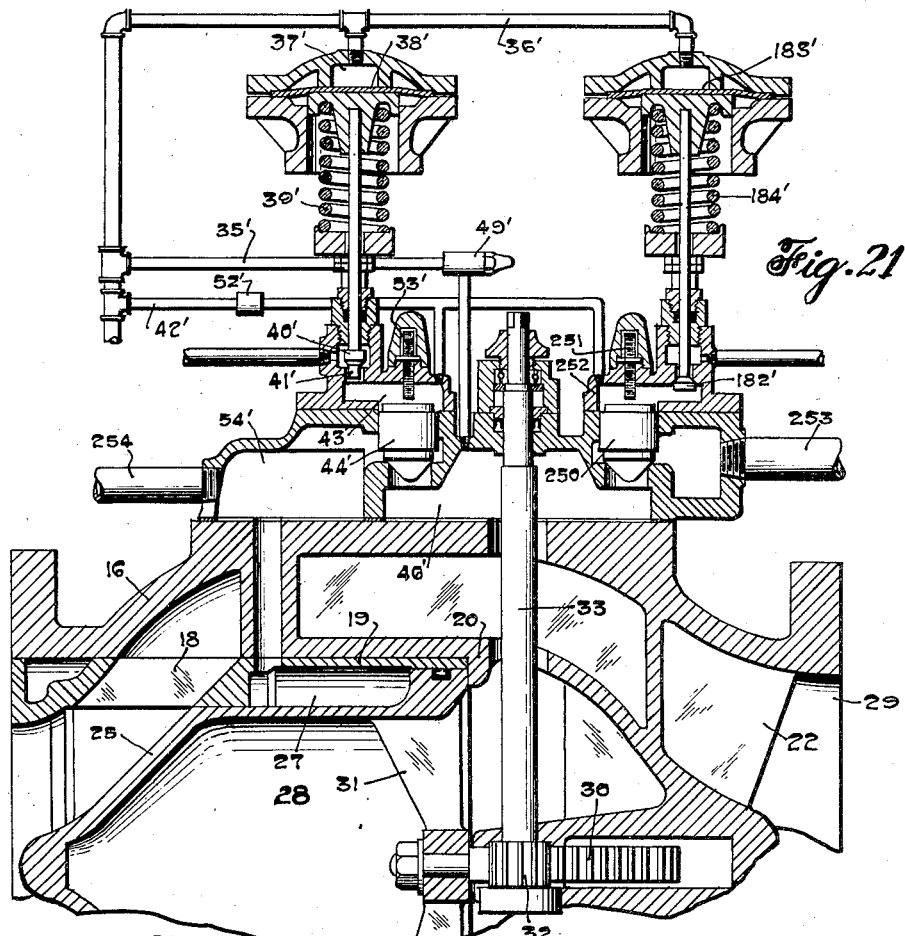
Figure 19:
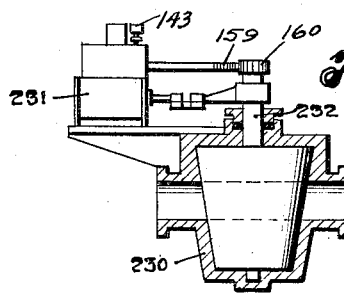
Figure 20:
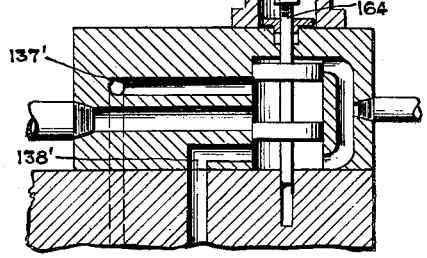

Fig. 7 diagrammatically illustrates several suppressors;

Fig. 8 is a diagrammatic plan view of several pumps supplying a common pipe line and solenoid control surge suppressors connected into each of the pump branches;

Fig. 9 is a sectional view of a portion of the suppressor valve and control therefor, the valve being shown in open position but the controls reset to effect reclosure of the suppressor valve;

Figs. 10 to 13 are diagrammatic views showing the relative positions of the control elements and suppressor valve of Fig. 9 during different phases of the cycle;

Fig. 14 is a fragmentary sectional view of a valve and a sectional view of a modified control therefor whereby the valve may function both as a suppressor valve and as a high pressure relief valve;

Fig. 15 is a curve showing surge waves due to a sudden shutdown of a centrifugal pump;

Fig. 16 is a further modification of a control and a surge suppressor embodying a closing spring;

Fig. 17 is a further modification similar to Fig. 16 but employing an opening spring for the suppressor valve;

Fig. 18 is a diagrammatic plan view of a pumping system including a pipe line having a motor-driven pump, a check valve and a suppressor valve of the form shown either in Figs. 16 or 17;

Fig. 19 diagrammatically illustrates the application of my improved control to a plug or cone type valve;

Fig. 20 is a fragmentary sectional view of a diaphragm operated four-way valve control;

Fig. 21 is a modification of Figs. 3 and 14 embodying high and low pressure limit controls arranged to open the conduit valve on either predetermined low or high pressures.

In the illustrated embodiments of the invention which are shown herein merely for the purpose of disclosing certain specific forms among possible others that the invention might take, I have shown in Fig. 1 a conventional pump and pipe line comprising a sump 1 or other suitable source from which water is drawn by a suitable pump 2 driven by any suitable prime mover such as an electric motor or the like. The pump is preferably of the centrifugal type so as to permit opening or closing of check valves C while the pump is still running, although other forms of pumps may be used, and also a plurality of separately driven pumps may be simultaneously or individually operated to commonly supply a pipe line generally indicated at 3. Two such pumps are shown in Fig. 1, although three or even more pumps may be used as shown in Fig. 7. The pumps are diagrammatically shown one above the other, although in practice they would be located normally on substantially the same level. The pipe line may take various forms both as to diameter and length and also as to its elevation as determined in accordance with the topography of the ground over which the pipe line is laid. As shown in Fig. 1, the pipe line has an intermediate high portion 4 followed by a valley portion 5 leading to the summit 6 of the system where a reservoir 7 is usually disposed. The pipe line as shown may be considered to represent diagrammatically any city water distribution system having laterals leading from the main pipe line.

A main suppressor valve generally indicated at 10 is disposed in the pipe portion 3 preferably near the pump end thereof and if desired a similar suppressor valve may be disposed in the valley portion 5. A combined air and suppressor valve 11 is disposed at an intermediate high point in the pipe line and preferably under certain conditions two such valves may be employed at spaced points 12 and 13 in accordance with an improved mode of operation to be described later.

*Main suppressor valve.*—As shown in Fig. 3 the pipe line has an outlet 15 to which is connected a suppressor valve casing 16, which is circular in cross-section and is tapered towards its ends. A cylindrical valve seat 17 is seated within the outer casing 16 and also is provided with longitudinal guide ribs 18 connected integrally with a sleeve 19. This sleeve is disposed within an inner stationary casing 20 having a closed and preferably conical tapered end 21. The inner and outer casings 16 and 20 are supported in spaced relation by suitable radial ribs 22 thereby to provide an annular fluid passageway 23 between these casings. An axially movable plunger 25 is slidably received within the forward reduced portion of inner casing 20 and in sleeve 19 as through a piston-like flange 26 thereby providing an annular chamber 27 and an internal closing chamber 28. Any equivalent piston and cylinder construction may be employed to move the valve element 25 to its closed and open positions irrespective of whether the valve element is of the plunger type or another type such as well-known forms of plug valves. Preferably but not necessarily the inner diameter of seat 17 is somewhat less than the other end 29 of the valve. To determine the position of plunger 25, a rack 30 is connected to the plunger through radial ribs 31. A pinion 32, secured to a shaft 33, engages rack 30 so that various axial positions of plunger 25 will be indicated by suitable markings on a member 34 (Fig. 3) secured to shaft 33.

Normally the plunger 25 is in its closed position against seat 17 in which case fluid pressure is acting within internal chamber 28 to hold the plunger closed. This closing force is effected in that the pipe line pressure is transmitted through pipes 35 and 36 to a diaphragm chamber 37 to force a diaphragm 38 downwardly against the tension of a spring 39, thereby causing an auxiliary pilot valve 40 to close a drain outlet 41. Fluid pressure is supplied from pipe 35 through a pipe 42 to a closing chamber 43 of a main pilot valve 44, the fluid pressure in this chamber not being permitted to escape through drain 41 by reason of its closure by valve 40. Closure of main pilot valve 44 closes a main drain orifice 45 of a chamber 46. Fluid pressure is supplied from pipe 35 to this chamber and from there the fluid flows through a chamber 47 into the internal chamber 28 to hold the plunger 25 in its closed position. Fluid from pipe 35 to chamber 46 must pass through control means generally indicated at 49 and specifically comprising a restricted orifice adapted to be adjusted by a threaded stem 50. A suitable cover 51 is removably secured to the casing of control means 49 so that an adjustment once made may if desired be sealed against further adjustment or in any event the adjustable stem will not be readily accessible. Likewise if desired a restricted orifice 52 may be interposed in line 42 for controlling the rate of closure of main pilot plunger 44. An important feature and mode of operation of this plunger or equivalent mechanism is to control its operation in such a manner that the single suppressor valve may operate to suppress surges created by the stopping of one, two or more pumps. This is effected by operating the pumps and determining the surge characteristics of the system in accordance with the number of pumps that may be stopped either alone or in combination with each other. By the provision of a relatively simple adjustable threaded stem 53, the maximum degree of opening of pilot plunger 44 may be precisely determined. By controlling the extent of opening of pilot 44, the rate of discharge of fluid pressure from chamber 28 to drain chamber 54 may be controlled, thereby determining the rate of opening of suppressor plunger 25. The result obtained thereby will be set forth more fully in the description to follow of the general mode of operation. Annular chamber 27 is preferably connected to drain chamber 54 at all times so that the suppressor plunger 25 will be opened only by means constituting the outer surface 55 of the plunger upon which pipe line pressure acts to move the plunger. While the main suppressor valve has been shown as of the plunger type, yet it is apparent that my improved control mechanism may be employed with valves of other types without departing from the principles of the invention disclosed herein.

Figure 4:
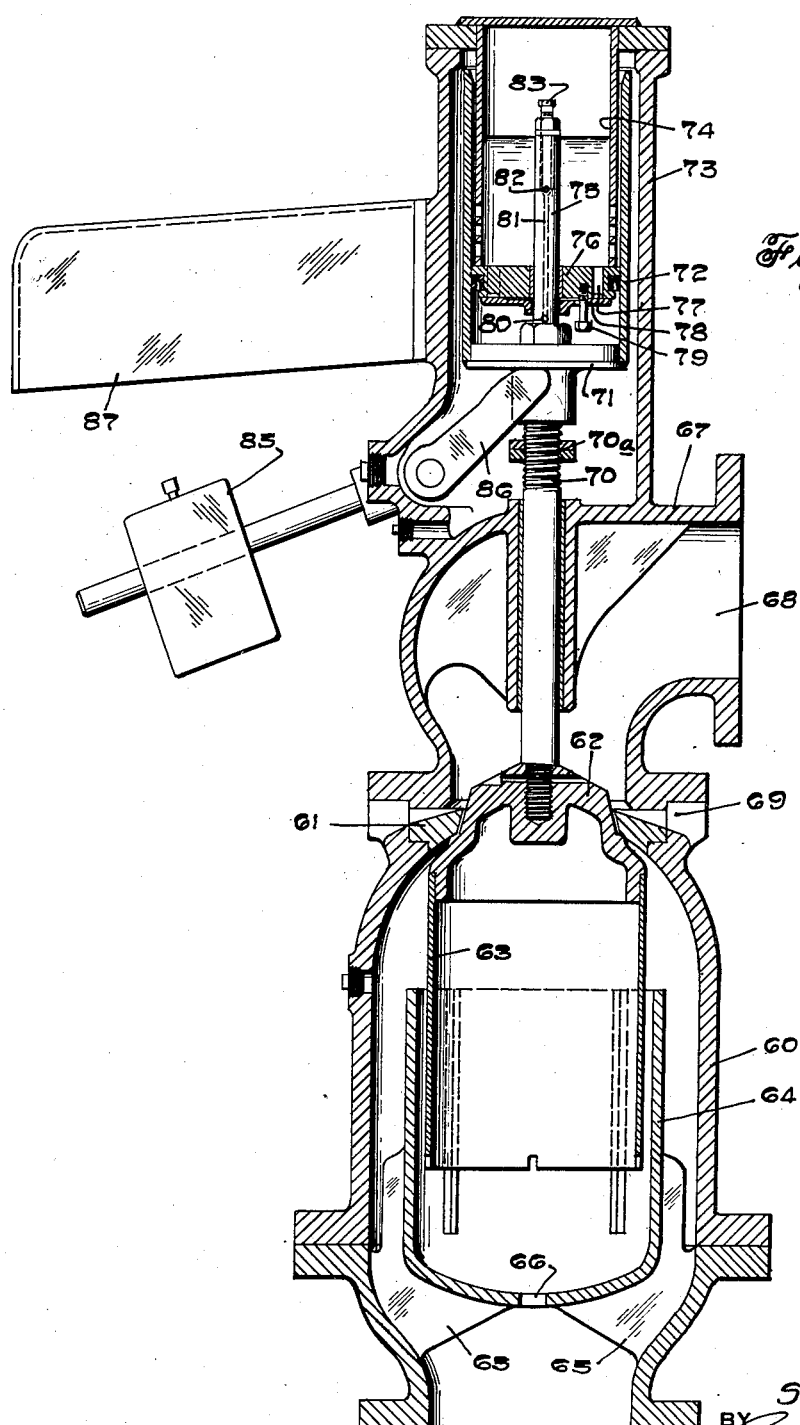
Fig. 4 is a sectional view of the combined air and suppressor valve for intermediate high points of the pipe line.

*Combined air vent and intermediate suppressor valve.*—Upon stopping of the pumps in a pumping system such as shown in Fig. 1, the down surge may cause sub-atmospheric pressure in the pipe line at an intermediate point such as 4. To prevent collapse of the pipe or parting of the water column under such sub-atmospheric pressure, it is necessary to admit air thereto and then when pipe line pressure is being restored to permit discharge of the air. Prior art devices have been provided for such purposes, but such devices have not been adapted to serve the further function of acting as an intermediate suppressor valve to take care of a return hydraulic surge, in case the subnormal pressure is created by pressure surges. Heretofore the air vent valve has closed substantially immediately when the air has been driven out of the pipe, but in my improved arrangement I definitely maintain the valve in open position even after the air has been discharged from the line, thereby providing a substantial free outlet for the return hydraulic surge and thus allowing its energy to be effectively dissipated. As shown in Fig. 4 this valve comprises an outer casing 60 adapted for connection to the top side of the pipe line, the line being provided of course with a suitable opening for communication with the interior of casing 60. A valve seat ring 61 is secured to said casing while a valve member 62 has a sleeve 63 suitably guided in spaced relation to an air trap cylinder 64. This cylinder 64 is suitably supported by the lower portion of outer casing 60 as through radial ribs 65, a small air admission opening 66 also being provided. A suitable casing 67 having a discharge outlet 68 is seated upon top of casing 60 with defrosting passages 69 formed therebetween. These defrosting passages communicate with the interior of casing 67 adjacent valve seat ring 61 in which they are formed. Due to valve 62 extending upwardly into the interior of casing 67, it is seen that water within said casing will immediately drain therefrom when the valve is shut. Due to this improved defrosting arrangement, water cannot accumulate within casing 67 to frost around valve 62 and thus prevent or restrict its operation. A stem 70 is secured to valve 62 and to the lower closed end 71 of a dashpot cylinder 72. This cylinder has an upper end in slightly spaced relation to a supporting housing 73 and an internal stationary dashpot piston 74. Stem 70 has an upwardly extending reduced portion 75 extending slidably through a lower wall 76 of a dashpot piston 74. A series of circumferentially disposed axial ports 77 are adapted to be closed by a valve element 78 axially slidable on stem 75, the downward movement of this valve disc being limited by a bolt 79. A bypass port 80 communicates with a passage 81 in stem 75, this passage in turn communicating through a port 82 with the interior of stationary piston 74. An adjustable screw 83 is adapted to adjustably restrict flow through passage 81. An adjustable counterweight 85 pivotally moves a finger 86 into contact with wall 71, thereby to balance the weight of the valve and dashpot mechanism to insure sensitivity of control, although if it is necessary to bias the valve slightly to its closed position, counterweight 85 may be adjusted to accomplish this purpose. A suitable cover 87 extends over the counterbalance. Nuts 70a limit the valve opening in proportion to surge conditions.

*Operation of combined air vent and suppressor valve and main suppressor valve.*—Assuming the pipe line to be filled with hydraulic fluid under pressure above atmosphere, the valve is then held in the closed position shown in Fig. 4 by air trapped within sleeve 63, this air being subjected to the pressure of water in casing 60 and cylinder 64. Upon a drop in pipe line pressure to a point below atmospheric pressure, which in my improved system is caused by a down surge upon stopping of a pump, the water in casing 60 and sleeve 63 will recede so as to reduce the holding air pressure on this valve, thereby allowing the atmospheric pressure acting on the top surface of valve 62 to move the same downwardly and admit air to the pipe line. As the valve moves downwardly, its stem 70 and cylinder 72 will likewise be moved down and dashpot liquid 89 will flow freely through the series of ports 77 and past valve disc 78 to the interior of cylinder 72. As the return surge occurs in the pipe line, the air therein is then discharged through outlet 68, the valve remaining open during this operation. However, when the air has been completely discharged from the pipe line, it is then desirable to dissipate the return hydraulic surge by maintaining, over an appreciable period of time which may be a matter of several seconds or minutes depending upon the length of the pipe line, a free discharge outlet for the liquid. During this return surge, water flows upwardly through port 66 to within cylinder 64 and also flows around the same to discharge upwardly through the discharge outlet 68. As the water accumulates in casing 64, air is trapped within sleeve 63 and thus creates a closing force on the interior of the valve. However, the valve is prevented from immediate reclosure due to the dashpot liquid which is trapped between walls 71 and 76, the valve disc closing port 77 immediately when the dashpot pressure is built up beneath the valve disc. The dashpot liquid then gradually flows through port 80, passage 81 and port 82 to the interior of the dashpot piston 74 thereby allowing gradual reclosure of valve 62. The mechanism 85 and 86 may serve to supplement the closing force or at least counterbalance the weight of the valve mechanism. Thus it is seen that my improved intermediate suppressor valve, by being disposed between the minimum surge pressure gradient and the normal static pressure gradient of the system, is adapted to function not only as an air vent valve but also as a suppressor valve, thereby minimizing dangerous pressure surges at intermediate points of the pipe line which could not otherwise be taken care of with full effectiveness by the main suppressor valve near the pump. However, any return surge that is not fully dissipated will merely continue to flow back toward the pump and be adequately taken care of by the main suppressor valve such as shown in Fig. 3.

During the foregoing operation and responsive to the same down surge, the reduced pressure in the pipe line near the pump end thereof is transmitted through pipes 35 and 36 to diaphragm chamber 37, thus permitting spring 39 to unseat pilot valve 40 and discharge holding pressure in chamber 43. Thereupon pressure within chamber 46 raises pilot valve 44. Closing pressure within internal chamber 28 is discharged through chambers 47 and 46 to the drain chamber 54, thereby permitting the plunger to be opened by fluid pressure acting on the nose of the plunger. The plunger is thus opened during the existence of subnormal pressure within the pipe line caused by a down surge. Hence the valve is opened prior to the return surge to permit its free discharge to thereby dissipate its energy. As the pressure in the pipe line builds up, this pressure is transmitted through pipes 35 and 36 to close pilot valve 40 and thus allow fluid pressure to accumulate in chamber 43. The fluid pressure for this chamber is supplied from pipe 35 through pipes 42 and restricted orifice 52 to effectively close pilot valve 44. Fluid pressure which is constantly supplied from pipe 35 past restricted orifice 49 will accumulate in chambers 46, 47 and 28 to gradually move the valve to its closed position.

From the foregoing disclosure of the combined air vent and intermediate suppressor valve and the main suppressor valve, it is seen that the opening movement of these two valves is initiated by the same down surge in the pipe line resulting in sequential opening and closing of these valves.

Figure 5:
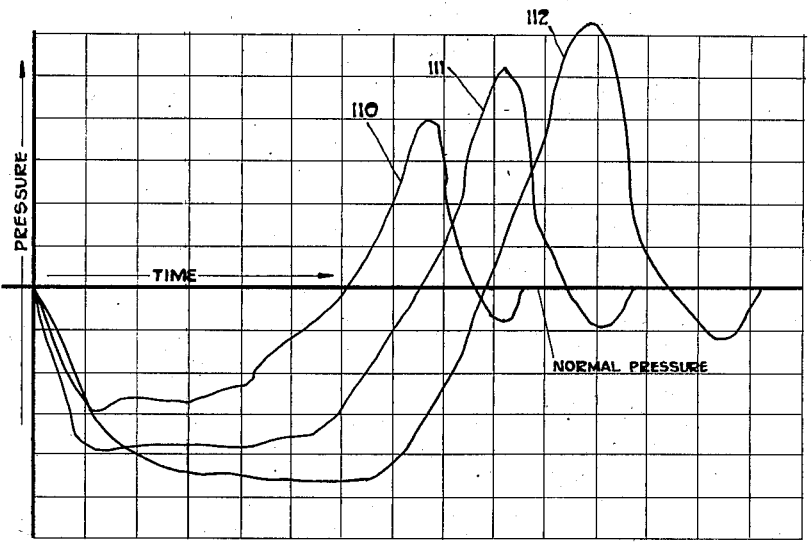
Fig. 5 is a diagram illustrating the surge curves resulting from the operation of one or more pumps.
Figure 6:
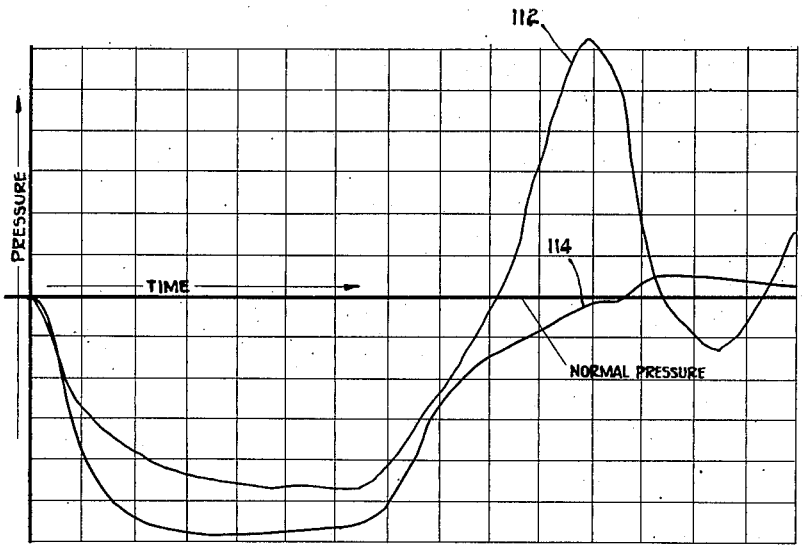
Fig. 6 is a diagrammatic view showing the result of suppressing a surge.

A further novel feature of my improved main suppressor valve relates to improved means whereby a single suppressor valve may be effectively used to control pressure surges of different initial magnitudes or intensities. For instance, in a pumping system employing two or more pumps, if one pump has been operating alone and is stopped, a pressure surge of a certain magnitude and time duration will occur as shown by the curve 110 in Fig. 5. The curve 114, Fig. 6, is illustrative of the suppressed surge. If two pumps have been operating and are stopped, the pressure surge will be somewhat greater than that for one pump but not twice as great, and the time interval will be somewhat greater than for one pump, this being shown by the curve 111. If three pumps have been operating and are stopped, the pressure surge is still somewhat greater than for two pumps but not necessarily in proportion thereto, and the time interval will also be greater, all as shown by curve 112. In my improved arrangement I control the pressure surges for any or all of these conditions by improved means for operating the suppressor valve at partial open positions or at full open position depending upon the number of pumps discontinued. To effect different degrees of valve opening, the pilot valve 44 is limited in its opening movement by adjustable screw 53, thereby restricting the rate of discharge of fluid from the closing chamber 28. As the time interval of the pressure surge increases for the increased number of pumps stopped, the longer the pilot valve 44 will remain open, and accordingly the plunger valve 45 will move to a correspondingly greater open position. The degree of opening of pilot valve 44 is determined by the system surge characteristics so that after these are once determined and the stem 53 is suitably adjusted so that the suppressor valve will function effectively for all combinations of pressure surges, the adjustable stem 53 is held in its set position and is preferably covered by a cap or otherwise prevented from being tampered with.

Two intermediate suppressor valves 11 are shown in Fig. 1 as it is assumed that the length of the intermediate high portion 4 is sufficiently great that sub-atmospheric pressure may occur in the initial portion of pipe 4 while the latter portion thereof is still under pressure above atmosphere, thereby necessitating the admission of air at position 12 before air must be admitted at position 13. This is caused by the fact that the wave of reduced pressure requires time to travel along the pipe. Thus it is seen that the intermediate suppressor valves will sequentially open first at position 12 and then at 13 as the down surge occurs. Conversely upon the return surge the valves will sequentially close first at the position 13 and then at 12. The foregoing sequential operation of the intermediate suppressor valves is employed more fully in the system of Fig. 2 wherein a series of intermediate suppressor valves are shown at positions 95—99. The water to be pumped is drawn from sump 100 by pump 101 and forced through pipe line 102 which is substantially horizontal until near its end, where it approaches a reservoir 103. When the pump stops, the down surge is assumed to create a wave of sub-atmospheric pressure successively passing the intermediate suppressor valves at their positions 95—99, these valves thereby sequentially opening to admit air to the line, whereas upon the return surge this air will be discharged through the valves and they will be then sequentially closed in their reverse order. The closure, however, will be under a controlled rate so as to insure proper dissipation of the return surge energy in the manner as above described. The main suppressor valve 10 in the Fig. 2 system has its outlet 29 connected by pipe 104 to the sump 100, thereby permitting a reflux action by reason of the fact that upon occurrence of the down surge the suppressor valve opens in the manner as above described for the Fig. 1 form, whereupon fluid flows from the sump 100 through suppressor valve 10 and into the pipe line, although upon the return surge the main suppressor valve still remains open to permit free discharge of the pipe line fluid to dissipate the return surge energy after which the valve is gradually closed.

Under certain conditions of operation it may be desirable to have a plurality of suppressors open successively in response to different degrees of pressure. This is accomplished by adjusting the tension of spring 39 of each suppressor so that their pilot valves 40 open in response to different pressures thus effecting successive openings of the suppressor valves in accordance with the magnitude of the surges, these surges being created by operation and stopping of one, two or more pumps or by other conditions which may arise in the pumping system or pipe line. Adjustable nuts 116 mounted on suitable studs are adapted to vary the tension of springs 39. It is also possible to cause the successively opened suppressors to open or close at different rates merely by suitably adjusting the auxiliary control valves for the individual suppressors in a manner similar to that previously described.

From the foregoing disclosure it is seen that I have provided highly efficient surge suppressors and a pumping system adapted to operate under a wide variety of pipe line conditions and water distribution service without danger of subjecting the pipe to dangerous or detrimental pressure conditions that will tend to weaken the pipe line or cause leaks therein.

In the modification shown in Fig. 8, a common pipe line 120 is supplied from either one or all of three pumping units 121, 122 and 123 each of which is substantially similar although their capacity may be different. Hence the description of this will suffice for all. The pumping unit includes a pump 124 driven by electric motor 125 while a suitable check valve 126, one specific form of which is shown in the joint application of Kerr and Greig, filed July 20, 1934, Serial No. 736,242, and a branch discharge pipe 127. A surge suppressor valve generally indicated at 128 is suitably connected into the side of the discharge branch 127. The pump motors are supplied with current from any suitable source such as a line 129, from which lead lines 130 are connected to the motors through any suitable or usual controller 131. The check valve 126 has a solenoid control as disclosed in said Kerr and Greig application supplied by wires 132 and similarly the suppressor valve 128 has a solenoid control supplied by wires 133' and operated in a manner to be described presently.

The suppressor valve that is preferably embodied in Fig. 8 may be of any suitable type such as of the plunger, plug or butterfly types hereinafter disclosed, although it is preferable to employ a plunger type valve such as shown in Fig. 9. This valve is identical to the valve shown in Fig. 3, the principal difference therefrom being in the control mechanism, and hence only this will be described. The purpose of this control is to effect operation of the suppressor valve in accordance with failure of the pump motor current whereby certain desirable results may be obtained over the pressure type of control shown in connection with Fig. 3. The suppressor valve is controlled by fluid pressure supplied from any suitable source through an inlet 133 to the center portion of an intermediate valve chamber 134 in which a valve having double spools 135 and 136 is disposed. When the valve is in its upper position as shown, fluid pressure flows from inlet 133 through passage 137 to the central chamber 28 of the plunger, whereas fluid pressure from the annular chamber 27 is discharged through passages 138 and 139 to a drain pipe 140. When the valve is in its lower position, the passage 138 communicates with the supply passage 133, and passage 137 communicates with the drain passage 139. A pair of nuts 141 and 142 are independently adjustably threaded on the control valve stem, while any suitable biasing means such as a spring or weight diagrammatically indicated at 143 constantly urges the control valve to its down position. The remaining control structure will be more apparent from the mode of operation which is as follows.

*Operation of Figs. 8 and 9.*—Assuming that the pump and motor 124 and 125 are operating, that check valve 126 is open and suppressor valve 128 is closed, then the suppressor controls and valve are in the position as diagrammatically shown in Fig. 10. In this case, a solenoid 145 is energized in the lines 129 so as to raise a core and weight 146. A trigger 147 is pivoted at 147' on the weight and is adapted at its inner end to engage a stop 148 to limit the upward movement of the trigger 147. During the running of the pump, a cam lever 149 is in a vertical position as shown fulcrumed about a fixed pivot 150. A link 151 is pivotally connected to the cam lever and to a lock pin 152 which is suitably guided in the walls of a box or housing 153. This lock pin is biased outwardly by a spring 154 interposed between the stationary part of the housing and a collar 155 secured to the pin. The outer end 156 of the pin projects beneath the upper collar 142 to hold the control valve in its upper position thereby causing pressure fluid to be supplied to the closing chamber 28 of the suppressor valve, while the opening chamber 27 is discharged to the drain 140, Fig. 9. The valve is thus held in its closed position as diagrammatically indicated in Fig. 10, it being understood that the position of the suppressor valve shown in Fig. 9 indicates the position of the valve just during its initial closing stroke.

Assuming now that the current supply for the pump motor 125 is discontinued either by throwing out the control 131 or by failure of the current, then solenoid 145 is deenergized and its core and weight 146 drop downwardly. As the trigger 147 moves downwardly with the weight, the trigger engages the lateral cam surface on lever 149 and 157 of lever 149 as shown in Fig. 11. The lever is thus rotated clockwise to pull latch pin 152 against the compression of spring 154 and thus permit the control valves 135 and 136 to fall downwardly due to the biasing means 143, Fig. 9. The solenoid weight 146 and trigger 147 come to rest at their lowermost position as shown in Fig. 12, at which time spring 154 has returned latch 156 to its outer position. However, by this time the limit stop 142 of the control valve has fallen below the latch pin 156, whereupon fluid pressure is now supplied from passage 133 to the annular space between valve spools 135 and 136 to passage 138 and thence to the opening chamber 27, the closing chamber 28 being drained through passages 137 and 139 to drain pipe 140.

The opening of the suppressor valve as above described in response to failure of the power current or stopping of the pump motor is in one aspect of the invention equivalent to opening the suppressor valve in response to a down surge. This is because a down surge in the pipe line is caused by sudden stopping of the pump such as discontinuance of its current supply thereto. Hence the suppressor valve is opened during the down surge and reclosing of the suppressor valve is so timed that the valve is in some open position during the return surge or succeeding pressure rise, thereby providing a free discharge outlet for dissipating the return surge. However, it is desirable to effect automatic reclosure of the valve during restoration of pressure conditions to normal, and to this end I have provided means whereby during opening of the suppressor valve the control valve 135 is reset to its upper position for effecting reclosure of the valve. In combination with this mechanism, I have provided means for determining the rate of opening and reclosure of the suppressor valve so that knowing the surge characteristics of a particular pumping system, I am able to adjust the rate control mechanism for effecting proper and efficient operation of the suppressor valve. The reclosing mechanism comprises, Figs. 9 to 13, a rack 159 actuated by a pinion 160 which is secured to the indicator shaft rod 33 of the suppressor valve. A cam 161 is secured to rack 159 for movement therewith as through a stem 162 extending through the body of the rack 159 in threaded engagement therewith. The inner end of stem 162 is suitably swiveled to cam 161 so as to permit rotational adjustment of stem 162 while at the same time insuring movement of the cam 161 and rack 159 together in either direction of movement thereof. The rack and cam are suitably guided in a recess in the body 163 of the control housing. The stem 164 of the control valve projects downwardly into the cam recess.

Still considering that the suppressor valve has just been opened upon failure of the pump-motor current, the cam 161 has been moved inwardly of its recess simultaneously with the opening of the suppressor valve due to rack and pinion 30 and 32, rod 33 and rack and pinion 159 and 160.

When the valve is opened to some predetermined position, cam 161 will engage control valve stem 164 and raise the same to its upper reclosing position such as shown in Fig. 9. As the control valve thus raises, the collar 142 engages the under rounded corner of lock pin 156 to force the same inwardly against the compression of spring 154, Fig. 10, but immediately after the collar 142 is above the lock pin, the latter is forced outwardly by spring 154 to prevent downward movement of the control valve. The main suppressor valve thereupon is closed by the supply of fluid pressure from passage 133 to passages 137 and closing chamber 28 while at the same time the opening chamber 27 is drained through passages 138, 139 and 140.

To control the rate of opening of the suppressor valve, collar 141 (Fig. 9) may be so adjusted on stem 164 as to engage the upper surface 165 of the control housing and thus cause the valve spools 136 to partially restrict the passages 137 and 138. Likewise the rate of reclosing of the valve can be determined by adjustment of collar 142 as it is seen that the restricted closure of the passages 137 and 138 in the upper position of the control valve 135 will be determined by the adjustment of collar 142 on the valve stem 164. Inasmuch as the collar 142 may at times be adjusted at some uppermost position on the valve stem, it is seen that the cam 161 is designed to effect a maximum upward movement of the control valve in which event the ports 137 and 138 are opened with a maximum rate of initial closing movement of the suppressor valve. However, the rate of closing movement is gradually reduced by reason of the control valve being permitted to drop downwardly until collar 142 engages latch pin 156. The control valve is able to thus drop because as the suppressor valve moves toward its closed position, the rack 159 in cam 161 is moved outwardly to clear the valve stem 164. Thereafter the suppressor valve will close at only such rate as is determined by the restriction of passages 137 and 138 by the control valve spools 136. It will be understood that cam 161 functions to definitely limit the degree of opening of the suppressor valve because immediately when the cam 161 has moved inwardly to raise the control valve 135, then the pressure control of the suppressor valve is such as to effect its reclosure. However, the extent of opening of the suppressor valve may be varied by adjusting the combined length of cam 161 and rack 159 as through the adjusting screw 162. Hence with the cam 161 moved nearer to rack 159, a longer time will elapse before the cam moves into its recess and engages the control valve stem with the result that the suppressor valve will have a large degree of opening. Conversely if the combined length of cam 161 and rack 159 is lengthened, then the cam will engage the control valve stem earlier and thus reset the control valve to effect reclosure of the suppressor valve at some shorter stroke thereof.

The various functions performed by the control mechanism of Fig. 9 may be suitably adjusted so that the operation of the suppressor valve can be coordinated with the surge characteristics of the pumping system irrespective of the fact that the suppressor valve is operated independently of the actual pressure conditions in the system.

*Interconnected operation.*—The foregoing mode of operation as described in connection with Figs. 9 to 13 has particular reference only to a single pumping unit such as 121, 122 or 123, although it will be understood that as the current for the respective pump units is disconnected, the suppressor valves for the respective pumping units will function in the above manner or if the main current from lines 129 should fail, then all suppressor valves connected to pumps in operation will open but in each case the suppressor valve for any particular unit is functioning only with respect to that unit. In other words, each pumping unit has only one suppressor valve. On the other hand, it may be desirable under certain conditions to have two suppressor valves for a single pumping unit, and to accomplish this I have provided an improved interconnection between the controls of two suppressor valves. For instance, a surge suppressor interconnecting bus 170 is adapted to be connected to one or more of the various suppressors whereby if only one pump such as 121 is operating and the other two pumping units are shut down, the suppressor or suppressors for the shutdown unit may be used in conjunction with the suppressor for the unit or units which are operating. To accomplish this, normally closed switches 171, 172 and 173 are provided in the lines 133 while normally open switches 174, 175 and 176 are provided in lines connected to the interconnecting bus 170. With only pumping unit 121 operating, if it is desired to utilize the suppressors of the non-operating units, then either one or both of switches 172 and 173 are opened and switches 174, 175 and 176 are closed. Hence the suppressors for each of the pumping units will be controlled in accordance with the current supply to the suppressors for pumping unit 121. The result is that all of the suppressors will open and close in accordance with the failure of the current supply to the pumping unit 121. If it is desired to utilize only two suppressors, then either switch 175 or 176 may be opened.

*Modification of Fig. 14.*—This valve and control are identical in the structure and mode of operation as the form shown in Fig. 3. Fig. 14, however, has the additional feature of being able to function as a relief valve for excess pressure without first having a down surge. To accomplish this, the chamber 43 is extended so as to communicate with a drain 180 through a valve port 181. This port is controlled by a valve 182 moved to its open position by fluid pressure supplied to a diaphragm 183 and moved to its closed position by a spring 184. The diaphragm chamber 183' is connected into an extended portion 36' of pipe 36.

In operation, if an excess pressure initially occurs in the pipe line, this pressure will operate diaphragm 183 to open port 181 thereby to drain chamber 43 and permit plunger valve 44 to open and effect opening of the valve plunger 25. When the pipe line pressure has dropped, then spring 184 will close port 181 and cause fluid pressure to build up in chamber 43 and close the pilot valve 44 to effect reclosure of the main valve 25. It will be understood that the springs 39 in both the forms of Figs. 3 and 14 are set so as to cause its valve 40 to remain closed during normal pressure conditions and will only open due to subnormal pressures of a degree determined by the adjustment of the spring. With spring 184, the valve 182 will remain closed for normal pressures and for pressures slightly in excess of normal but will be arranged to permit the opening of valve 182 when excess pressures exist beyond this setting. Thus both valves 40 and 182 would be normally closed during operation of a pumping unit but would be opened in case the pressure went above or below a determined range of pressures to cause valve 25 to act as a relief orifice either during subnormal pressures in advance of the return surge or due to excess pressures caused by other conditions. Thus in Fig. 15 illustrating a typical surge variation plotted with respect to time, the valve 40 would be set to trip open at approximately point 186 and to reclose at point 187. If the plunger 25 closed too rapidly or was not sufficiently far open and the pressure continued to rise, reaching point 188, valve 182 would open and would reclose again at point 189. This cycle would be repeated during the successive waves as illustrated in this diagram. This would have the effect of tending to hold valve 25 open during successive surge intervals until they diminished within the range between lines through point 187 and point 189. The initial down surge to trip controls at point 186 and point 187 is not essential in order to have valve 182 operate at point 188 and point 189 as, for example, in the event a discharge valve was suddenly closed the pressure would rise first rather than decreasing initially. Hence valve 182 permits opening of the plunger 25 on excess pressure to relieve this up surge.

*Fig. 16 modification.*—This valve comprises a casing 190 having an inlet 191 and an outlet 192. A closing chamber 193 has a piston 194, the opposite side of which is open to drain 195. A piston rod 196 has a valve 197 for closing outlet 192 while an auxiliary closing spring 198 is interposed between valve 197 and an adjustable yoke 199.

The control mechanism for this type of valve includes a supply passage 200 controlled by an adjustable valve 201. Also a valve mechanism 202 is provided in a drain 203 from the closing chamber 193. This valve is controlled by a solenoid 204 connected into the circuit of a pump-motor 204a (Fig. 18) whereby upon failure of the current supply the solenoid will be deenergized and dropped to actuate a lever 205 pivoted at 206 to raise the valve stem 207 and drain chamber 193. Valve stem 207 is limited in its upward movement by an adjustable screw 208 thereby effecting a predetermined restricted flow through valve 202 and thus controlling the rate of discharge from chamber 193 and accordingly the rate of opening of valve 197.

Simultaneously with the deenergization of solenoid 204 a second solenoid 210 is deenergized whereupon a lever 211 pivoted at 212 will move a valve stem 213 downwardly to close a normally open valve 214. The rate of closure of this valve is controlled by a dashpot 215 and an adjustable bypass 216. As a result, valve 214 will close after a given period of time preventing further drainage from chamber 193 and thus terminating the opening movement of valve 197. By suitable adjustment of the bypass 216 in combination with the rate of opening as determined by valve 202 the degree of maximum opening of the suppressor valve 197 will be determined.

To effect automatic reclosure of the suppressor valve considering that the solenoids 204 and 210 are still deenergized and the valve 214 is closed, fluid pressure is transmitted from passage 200 to closing chamber 193 and thus produces a closing force for the valve 197 which force in combination with the force of spring 198 will effect reclosure of the relief orifice 192. It will be understood that the valve 197 opens during a down surge and is reclosed during or upon restoration of normal pressure conditions in the pipe line.

In starting up the pump 217, Fig. 18, should the check valve 217a open too rapidly, an excess pressure surge may be imposed on the conduit or pipe line 217b due to the acceleration of the flow in the conduit at too rapid a rate. To avoid this condition, the control of the surge suppressor is arranged with a dashpot 218 and bypass 219 which restrains the movement of lever 205 against the action of solenoid 204. Solenoid 210 has already moved freely due to the free flow of fluid past the dashpot piston when moving in the upward direction through spring-loaded valves 220, thus opening the drain from the closing chamber through valve 214 rapidly and due to the restraining action of the dashpot 218, the valve 202 is held open a definite period of time, thus releasing the pressure in the closing chamber and opening valve 197 providing a relief orifice through 192. As the solenoid plunger 204 reaches the end of its stroke, valve 202 will be reclosed and pressure will build up in the closing chamber 193 providing force to reset valve 197 and close off orifice 192. Thus the surge on opening has been relieved through a free discharge and the closure has been effected at a rate controlled by valve 201 in accordance with the requirements of the system. In the opening stroke of valve 202, upon the failure of current to solenoid 204 when the pump-motor circuits are deenergized, the downward movement of the lever 205 is freely permitted in the dashpot 218 by means of the slightly spring-loaded valves 217. Thus on being deenergized, valve 214 is delayed in its closure while on being energized valve 202 is delayed on its closure.

*Modification of Fig. 17.*—The suppressor valve structure and control mechanism of this modification are the same as that shown in Fig. 16 except that in place of a closing spring such as 198, an opening spring 225 is employed. This spring is interposed between an adjustable yoke 226 attached to the valve body 190 and a collar 227 secured to an extension 196' of the valve stem 196. This construction may be used in cases where a more rapid initial opening is required or where the initial opening is required at a higher pressure than could be obtained with the closing spring 198. That is, with the closing spring resisting the opening movement, the pressure required to unseat the valve 197 will be much higher than will be the case with spring 225. Thus spring 225 will permit the valve 197 to remain open at a lower pressure and will also assist in opening the valve more promptly than would be the case with spring 198.

*Fig. 19 modification.*—As previously mentioned, various types of valves may be used for suppressor valves providing that the proper control mechanism is employed therewith. To this end, it will be noted that in Fig. 19 a so-called plug type of valve has an outer casing 230 and a rotatable valve element of either a cylindrical or tapered form disposed therein. The valve element may be rotated by a piston and servo-motor 231 actuating a valve stem 232. Such a servo-motor would provide opening and closing chambers corresponding broadly to the opening and closing chambers 27 and 28 such as shown in the Fig. 9 form and others, although in the event of utilizing a differential piston in the servo-motor 231, then the face 55 of the plunger shown in Fig. 3 is also a part of the opening means for the valve. The control mechanism of the Fig. 9 type when applied to this plug type of valve would be associated with the valve stem 232 in the same manner that the control valve mechanism is associated with the rod 33 of Fig. 9. In other words, the rod 33 in Fig. 9 and the valve stem 232 both represent position of the main valve. It will, of course, be understood that the passages 137 and 138 lead to the opposite ends of the servo-motor cylinder functioning as opening and closing chambers in the same manner as shown in Fig. 9.

*Fig. 20 modification.*—In applying the Fig. 3 diaphragm control to a plug type of valve (Fig. 19) or in applying the diaphragm type to the Fig. 9 modification, a four-way control valve and passage arrangement similar to 135, etc. of Fig. 9 is utilized, the control valve being actuated by the diaphragm mechanism 36—39 of Fig. 3 and the passages 137 and 138 being reversed so that passages 137' and 138' connect respectively with the opening and closing chambers for the valves. In this case, the valve stem 40 of Fig. 3 is connected to the valve stem 164 at a point above the collar 142. However, the solenoid 145 and associated mechanism including latch lock pin 156 are not utilized but instead thereof an upper stop 240 is adapted to limit the upward movement of the four-way control valve, thus regulating the closing movement of the plug valve or the plunger valve in case this is used. The collar 141 will as in Fig. 9 limit the opening rate. In applying the diaphragm control to the four-way valve, the resetting cam 161 and rack 159 are unnecessary as the resetting of the four-way valve will be accomplished by the spring 39.

*Modification of Fig. 21.*—This valve and control are identical in structure and mode of operation as the form shown in Fig. 14 wherein the valve opens either on an initial up surge or an initial down surge but the rate of opening is the same in each case. Fig. 21, however, has the additional feature which permits the rate of opening for the relief of an initial up surge to be different from the rate of opening for the relief of a return surge following an initial down surge. To accomplish this, chamber 46' is connected to the blow-off valve 44' similar to the arrangement shown in Figs. 3 and 14. In addition, however, blow-off valve 250 of similar construction to 44 is included and is controlled by diaphragm 183', spring 184' and valve 182'. Thus upon an increase in pressure above the values set by spring 184', valve 182' will open discharging pressure from the top of valve 250 and exhausting chamber 28 of the surge suppressor valve, thus permitting plunger 25 to open at a rate determined by the stroke of valve 250 as set by the adjusting screw 251 in the control housing 252. The fluid contained in chamber 28 is exhausted through drain 253 independently of the drain chamber 254. Upon the restoration of pressure to normal, the diaphragm 183' will reclose valve 182', blow-off valve 250 will reclose and the pressure will be supplied through line 35' through the adjustable valve 49' into chamber 46' and reclose the plunger 25. The functioning of the two diaphragm controlled valves 183' and 38' will be the same as described for the modification of Fig. 14 except that the rate of opening on an initial up surge can be made more rapidly than is desirable for the opening of the valve plunger 25 in the case of a return surge following an initial down surge. For example, in Fig. 15, the time for the opening of the surge compressor between the initial point 256 and point 187 when the controls would tend to open is much greater than the time for the pressure to rise from point 187 to point 188. The sudden rise in pressure from point 187 to point 188 is characteristic of initial up surges and requires a much more rapid rate of opening of a relief valve. In the case where an initial down surge is followed by a return surge, the additional time allowance during the down surge requires a much slower rate of opening in this case, and hence the modification shown in Fig. 21 permits the independent control of the rates of opening for these two types of surges.

It will of course be understood that various changes in details of construction and arrangement of parts may be made by those skilled in the art without departing from the spirit of the invention as set forth in the appended claims.

I claim:

1. In a pipe line subject to pressure surges, said pipe line having a relief aperture, a valve normally closing said aperture, means forming an operating chamber in which fluid pressure effects a closing force on said valve, means for opening said valve in response to a drop in pressure within said line, and means for controlling flow of operating fluid into said closing chamber during the succeeding pressure rise to effect a free discharge outlet for the pipe line fluid.

2. A suppressor valve in a pipe line subject to pressure surges wherein a down surge causes a drop in pressure which is followed by a return surge or succeeding rise in pressure, the combination comprising a normally closed valve controlled outlet for said pipe line, means for positively controlling the movement of said valve automatically in response to and in accordance with the extent of a down surge thereby to provide for the return surge a free discharge outlet of varying degrees of opening corresponding to said extent of down surge, and means for effecting subsequent reclosure of said valve during restoration of pressure conditions to normal.

3. A pumping system comprising, in combination, a pipe line subject to pressure surges of different initial characteristics, a normally closed valve controlled relief outlet for said line, means whereby an opening force is exerted on said valve, and means for positively controlling the rate of application of said force to said valve in response to a down surge and for effecting different degrees of valve opening automatically in accordance with the extent of initial down surge, thereby to provide a free discharge outlet for a return surge.

4. A hydraulic pumping system comprising, in combination, a line which is subject to hydraulic pressure surges of different initial characteristics caused by stopping of a pump or pumps, a normally closed surge suppressor valve for said line adapted to be opened during existence of subnormal pressure caused by a down surge thereby to provide a free discharge outlet for the return surge, means for exerting an opening force on said valve, and means for positively controlling the rate of application of said force so as to effect different degrees of valve opening automatically in accordance with the extent of the initial down surge.

5. A hydraulic pumping system comprising, in combination, a pipe line subject to pressure surges of different initial characteristics, a suppressor valve normally closing a relief outlet for said line, actuating means for opening said valve, and control means for said actuating means adapted during the existence of subnormal pressure caused by a down surge to effect opening of said valve to various positions automatically in accordance with said characteristics thereby to provide for the return surge a free discharge outlet whose capacity is in proportion to the characteristics of the surge.

6. The combination set forth in claim 5 further characterized in that said actuating means includes fluid pressure opening and closing means, and main and auxiliary fluid pilot valves for controlling said opening and closing means.

7. The combination set forth in claim 5 further characterized by the provision of diaphragm controlled means responsive to pressure conditions in said pipe line, and means whereby said diaphragm means initiates operation of said actuating means to open said suppressor valve upon occurrence of a down surge.

8. A hydraulic pumping system comprising, in combination, a pipe line subject to pressure surges of different initial characteristics, a suppressor valve normally closing a relief outlet for said line, fluid pressure opening means for said valve, and means for controlling the rate of operation of the fluid pressure for said opening means whereby said valve during the existence of subnormal pressure created by a down surge opens to different positions automatically in accordance with the length of time required for the initial surge thereby to provide for the return surge a free discharge outlet whose capacity is in proportion to the magnitude of the surge.

9. A hydraulic pumping system comprising, in combination, a pipe line subject to pressure surges of different initial characteristics, a suppressor valve normally closing a relief outlet for said line, actuating means for said valve including a fluid pressure closing chamber, and means for controlling the rate of discharge of fluid from said closing chamber whereby said valve during the existence of subnormal pressure created by a down surge opens to different positions automatically in accordance with the length of time required for the initial surge thereby to provide for the return surge a free discharge outlet whose capacity is in proportion to the magnitude of the surge.

10. The combination set forth in claim 9 further characterized in that the closing pressure fluid is supplied through a restricted passage thereby to effect a controlled rate of valve closure.

11. A pumping system comprising, in combination, a pipe line subject to pressure surges of different initial intensities, a normally closed valve controlled outlet for said line, means whereby said valve is opened and closed by fluid pressure in response to pressure surges and the closing pressure fluid is discharged to a point of low pressure during opening movement of the valve, and means for controlling the rate of discharge of said closing pressure fluid thereby to effect varying degree of opening of said valve automatically in accordance with the extent of the initial down surge in the pipe line.

12. A pumping system comprising in combination, a pipe line subject to pressure surges upon operation of a pump whereby a down surge created upon stopping of the pump is followed by a return surge, means providing a source of liquid from which fluid is supplied to said line, a normally closed valve controlled outlet for said line, said outlet being connected to said source of liquid, means whereby said valve is opened during a down surge in said line to permit flow of fluid from said source to said line through said valve, and means controlling the reclosure of said valve to provide a discharge outlet for the return surge.

13. A pumping system comprising, in combination, a pipe line, a pumping unit for supplying said line, a normally closed valve controlled outlet for said line, means for opening said valve upon an initial pressure rise above normal, and means for opening said valve to provide a free discharge outlet for a return surge following an initial down surge.

14. A hydraulic pumping system comprising, in combination, a pipe line subject to surges upon starting of the pump, a normally closed valve-controlled outlet for said line, means for effecting opening of said valve automatically upon starting of said pump to relieve surges created during starting, thereby to provide an outlet upon starting of the pump and thus control the production of surges, and means for thereafter effecting automatic reclosure of said valve.

15. A hydraulic pumping system comprising, in combination, a pipe line subject to surges upon starting of the pump, a normally closed valve-controlled outlet for said line, means for effecting opening of said valve automatically upon starting of said pump to relieve surges created during starting, thereby to provide an outlet upon starting of the pump and thus control the production of surges, means for thereafter effecting automatic reclosure of said valve, and means for opening said valve upon stopping of the pump.

SAMUEL LOGAN KERR.